Nov. 26, 1946.    J. A. RAMSEY    2,411,757
PISTON RING
Filed July 14, 1944    3 Sheets-Sheet 1
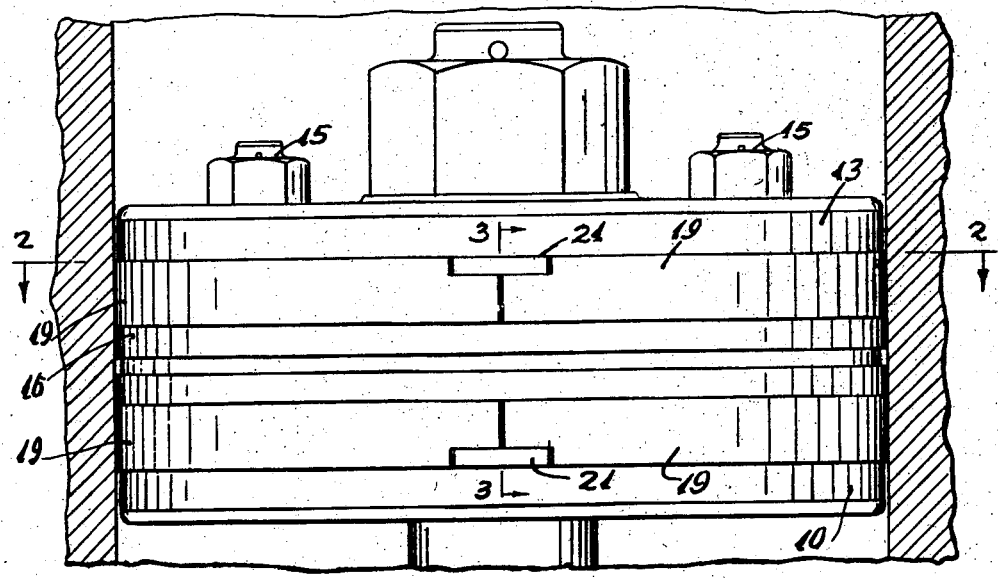
FIG-1-
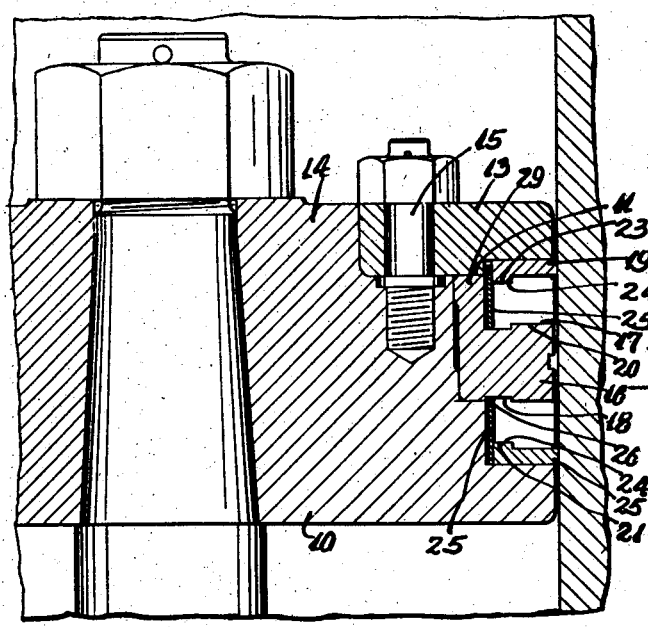
FIG-3-
INVENTOR.
Jesse A. Ramsey
BY
ATTORNEY Nov. 26, 1946.   J. A. RAMSEY   2,411,757
PISTON RING
Filed July 14, 1944   3 Sheets-Sheet 2
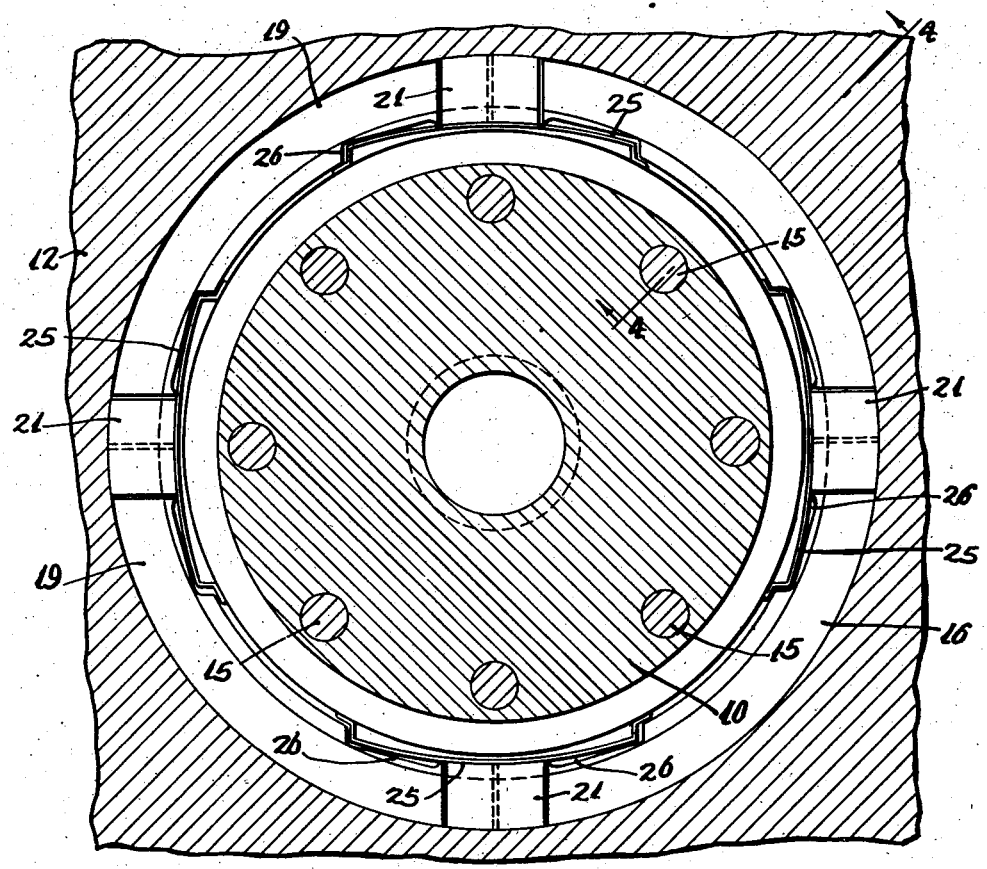
FIG-2-
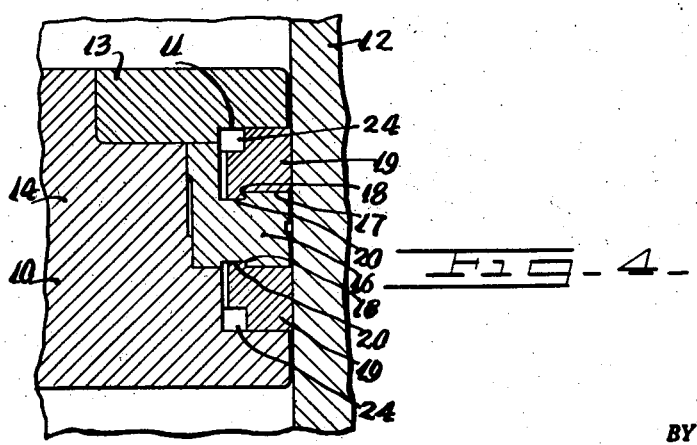
FIG-4-
INVENTOR.
Jesse A. Ramsey
BY
ATTORNEY Nov. 26, 1946.     J. A. RAMSEY     2,411,757
PISTON RING
Filed July 14, 1944     3 Sheets-Sheet 3
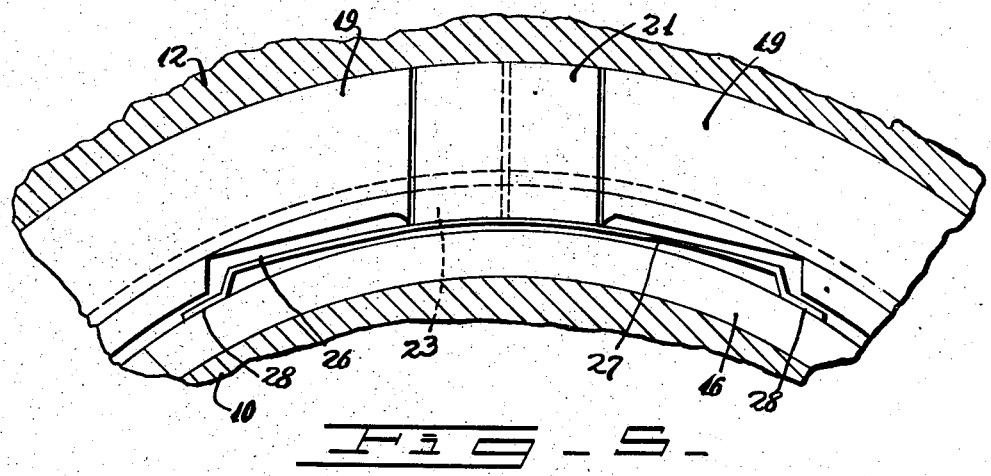
FIG-5-
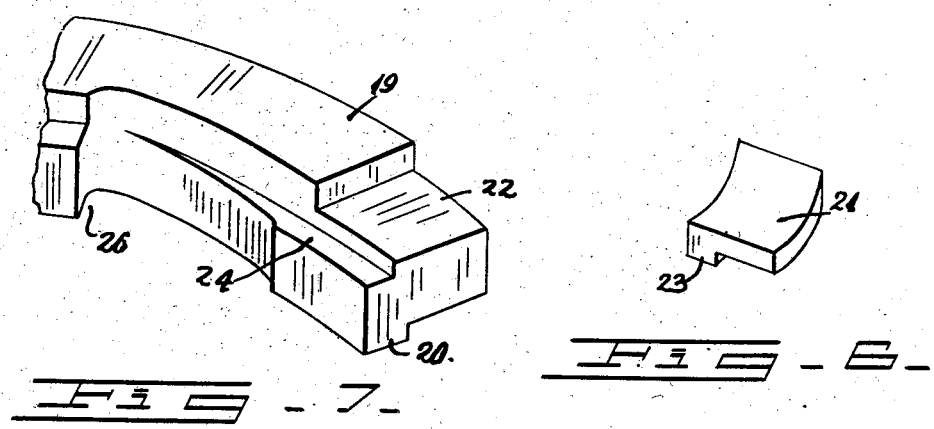
FIG-7-     FIG-6-
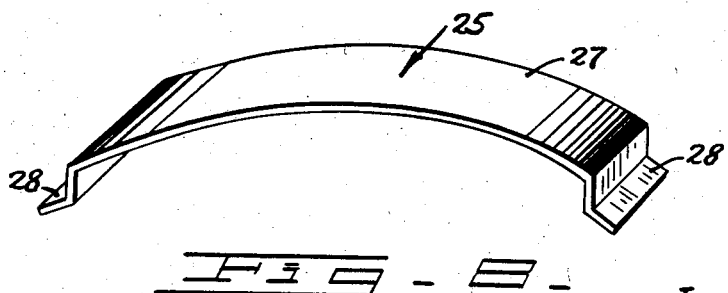
FIG-8-
INVENTOR.
Jesse A. Ramsey
BY
ATTORNEY Patented Nov. 26, 1946

2,411,757

UNITED STATES PATENT OFFICE 2,411,757

PISTON RING

Jesse A. Ramsey, Wenonah, N. J.

Application July 14, 1944, Serial No. 544,874

3 Claims. (Cl. 309—44)

This invention relates to new and useful improvements in a piston ring assembly.

More particularly, the invention proposes an improved piston ring assembly which is characterized by a bull ring mounted in a groove of a piston and having a transverse face formed with an annular recess spaced inwards from the outer edge thereof and cooperative with an annular member mounted in the annular space between said transverse face and one transverse face of said groove in the piston ring, and said annular member being formed of a plurality of sections having their ends in end alignment with each other and having an annular projection engaging said annular recess for limiting extension of said sections. It is also proposed to provide sealing pieces set into radial recesses in said annular member and overlapping the adjacent ends of said sections and having projections engaging recesses in said annular member for limiting extension of the sealing pieces. Resilient means is used for extending said sections and sealing pieces against said limiting projections.

An important feature of the new piston ring resides in the fact that because of its inherent construction the sections of the annular member cannot engage against the wall of a cylinder with such destructive force as to cut and groove the cylinder wall. Because the sections of the annular member are restrained the possibility of their breaking is materially reduced.

Because the annular member is formed of sections it eliminates undue strain which develop as the piston ring wears, causing uneven cylinder wear and ring breakage. In general, the new and improved piston rings have a long life because as they wear it is possible to refinish the limiting projections and thus compensate for wear.

Furthermore, no matter how much the piston ring is worn over a period of years, the seal pieces will keep the joints sealed so that no leakage takes place. The resilient means prevents leakage out from under the seal pieces. It seals the joints immediately under the seal pieces.

The invention contemplates the use of more than one piston ring assembly in one groove, in accordance with this invention.

The new and improved piston ring assembly requires no cylinder oil. There are no screws, pins or other weak members to work loose and destroy the usefulness of the piston ring. The new and improved piston ring assembly works equally well in liquid ends of pumps and auxiliary machinery.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a sectional view through a cylinder provided with a piston having a piston ring assembly constructed in accordance with this invention.

Fig. 2 is a horizontal sectional view taken on the line 2—2 of Fig. 1.

Fig. 3 is a fragmentary enlarged vertical sectional view taken on the line 3—3 of Fig. 1.

Fig. 4 is another fragmentary enlarged vertical sectional view, this view being taken on the line 4—4 of Fig. 2.

Fig. 5 is an enlarged detailed view of a portion of Fig. 2.

Fig. 6 is a perspective view of one of the seal pieces.

Fig. 7 is a fragmentary perspective view of one of the sections of the piston ring.

Fig. 8 is a perspective view of one of the springs used in the piston ring assembly.

The new and improved piston ring assembly, according to this invention, is used in combination with a piston 10 having a peripheral groove 11 for a piston ring assembly. This piston 10 is shown constructed with a follower 13 and a main part 14 secured together with fastening elements 15, such as studs, so that the piston assembly may be engaged into and removed from the groove 11.

The new and improved piston ring assembly is disposed within the groove 11 and includes a bull ring 16 mounted within the groove 11 and having a transverse face 17 formed with an annular recess 18 spaced inwards from the outer edge thereof. An annular member 19 is mounted in the annular space between the transverse face 17 and one of the transverse faces of said groove 11. The annular member 19 is formed from a plurality of sections having their ends in end alignment with each other. In the particular design disclosed the annular member 19 is formed of four sections.

The annular member 19 is provided with an annular projection 20 complementary to and engaging said annular recess 18 and forming a limiting means for preventing extension of the sections forming the annular member 19 more than a certain predetermined amount. Sealing pieces 21 are set into radial recesses 22 formed in the annular member 19 and overlap the adjacent ends of the sections thereof. These sealing pieces 21 have projections 23 engaging recesses 24 formed in said annular member 19 for limiting extension of the sealing pieces. Resilient means in the nature of springs 25 engage against the sections of the annular member 19 and the sealing pieces 21 for urging them into their extended positions.

The inner diameter of the annular member 19 is formed with recessed portions 26 forming room for the springs 25. Each spring 25 is formed from a strip of spring material. Each spring has a central curved portion 27 and offset ends 28. The ends 28 rest against a flange 29 extended upwards from the bull ring 16. The central portion of the spring 27 engages against the projection 23 of the sealing piece 21 and against the adjacent end portions of sections of the annular member 19.

In the particular design of piston ring assembly disclosed on the drawing a second annular member 19' is associated with the bottom side of the bull ring 16. More particularly, the piston 10 has an auxiliary bottom groove portion 11' into which the second annular member 19' engages. The bottom face of the bull ring 16 is formed with an annular recess 18' which is engaged by a complementary projection 20' formed on the top of the annular member 19'. The annular member 19' is mounted in an annular space between the bottom transverse face of the bull ring 16 and the adjacent faces of said auxiliary groove portion 11'.

Sealing pieces 21 are set into radial recesses formed in the bottom of the annular member 19' at the overlapping adjacent ends of the sections thereof. These sealing pieces 21 have their projecting portions 23 engaging recesses in the annular member 19' for limiting extension of the sealing pieces. The sections of the member 19' are limited in their extension by the projections 20' engaging the shoulders 18'. Springs 25 are engaged within recesses 26 formed in the annular members 19' and serve to extend the sections of the annular member 19' and the sealing pieces 21 substantially in the same manner as described relative to the first mentioned annular member 19.

The operation of the piston ring assembly may be understood from the following:

The springs 25 urge the sections of the annular members 19 and 19' and urge the sealing pieces 21 outwards against the limiting shoulders 18 and 18' and the shoulders formed by the recesses 24 in the annular members so that the outer diameter of the annular members 19 and 19' are limited in their resilient engagement against the wall of the cylinder 12. For this reason the piston rings are restrained from grooving and damaging the cylinder wall.

In fact, the piston rings may be used in a damaged cylinder wall, and after a time the damaged surface will be worn away and the piston rings will work better than when initially mounted in position. They may be reset from time to time whenever adjustment is required by merely increasing the diameter of the shoulders 18 and 18' of the bull ring 16. This permits the annular members 19 and 19' to extend a slight distance further and compensate for wear.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a piston having a bull ring adapted to be mounted in a groove and having a transverse face formed with an annular recess spaced inwards from the outer edge thereof, an annular member mounted in the annular space between said transverse face and one transverse face of said groove and formed of a plurality of sections having their ends in end alignment with each other and having an annular projection engaging said annular recess for limiting extension of said sections, sealing pieces set into radial recesses in said annular member and overlapping the adjacent ends of said sections and having projections engaging recesses in said annular member for limiting extension of said sealing pieces, and resilient means for extending said sections and sealing pieces, comprising leaf springs mounted within recesses formed in the sections of said annular member.

2. In a piston having a bull ring adapted to be mounted in a groove and having a transverse face formed with an annular recess spaced inwards from the outer edge thereof, an annular member mounted in the annular space between said transverse face and one transverse face of said groove and formed of a plurality of sections having their ends in end alignment with each other and having an annular projection engaging said annular recess for limiting extension of said sections, sealing pieces set into radial recesses in said annular member and overlapping the adjacent ends of said sections and having projections engaging recesses in said annular member for limiting extension of said sealing pieces, and resilient means for extending said sections and sealing pieces, comprising leaf springs mounted within recesses formed in the sections of said annular member, said springs having offset ends and having curved central portions which engage against said sections and sealing pieces.

3. In a piston having a bull ring adapted to be mounted in a groove and having a transverse face formed with an annular recess spaced inwards from the outer edge thereof, an annular member mounted in the annular space between said transverse face and one transverse face of said groove and formed of a plurality of sections having their ends in end alignment with each other and having an annular projection engaging said annular recess for limiting extension of said sections, sealing pieces set into radial recesses in said annular member and overlapping the adjacent ends of said sections and having projections engaging recesses in said annular member for limiting extension of said sealing pieces, and resilient means for extending said sections and sealing pieces, said bull ring being provided with another annular recess on another transverse face thereof, a second annular member mounted in the annular space between said second transverse face and another transverse face of a portion of said groove in the piston and formed of a plurality of sections having their ends in end alignment with each other and having an annular projection engaging an annular recess for limiting extension of said sections, and additional sealing pieces set into radial recesses in said second annular member and overlapping the adjacent ends of the sections thereof and having projections engaging recesses in said latter annular member for limiting extension of the sealing pieces, and additional resilient means for urging the sections of the second-named annular member and their sealing pieces into limited extended positions, and said resilient means comprising leaf springs mounted within recesses formed in the sections of said annular members.

JESSE A. RAMSEY.